(12) United States Patent
Guarino

(10) Patent No.: US 7,280,049 B2
(45) Date of Patent: Oct. 9, 2007

(54) ENCODER RUNOUT ERROR CORRECTION CIRCUIT

(75) Inventor: Gregg A. Guarino, Rochester, NY (US)

(73) Assignee: Xerox Corporation, Stamford, CT (US)

(*) Notice: Subject to any disclaimer, the term of this patent is extended or adjusted under 35 U.S.C. 154(b) by 556 days.

(21) Appl. No.: 10/847,153

(22) Filed: May 17, 2004

(65) Prior Publication Data
US 2005/0253054 A1  Nov. 17, 2005

(51) Int. Cl.
*H03M 1/22* (2006.01)

(52) U.S. Cl. ............... 341/11; 341/17; 341/1; 250/231.13; 250/213.17; 250/213.14

(58) Field of Classification Search ............ 341/1–17, 341/92; 250/231
See application file for complete search history.

(56) References Cited

U.S. PATENT DOCUMENTS

| | | | |
|---|---|---|---|
| 6,043,483 A * | 3/2000 | Schreiber .......... | 250/231.13 |
| 6,215,119 B1 * | 4/2001 | Markham et al. ...... | 250/231.14 |
| 6,639,207 B2 * | 10/2003 | Yamamoto et al. .... | 250/231.14 |
| 6,646,571 B1 * | 11/2003 | Soar et al. .............. | 341/13 |
| 6,972,403 B2 * | 12/2005 | Martenson et al. .... | 250/231.13 |
| 7,060,969 B2 * | 6/2006 | Uchiyama et al. ..... | 250/231.16 |
| 7,091,883 B2 * | 8/2006 | Kunow et al. ......... | 341/9 |
| 7,126,107 B2 * | 10/2006 | Ahne et al. ........... | 250/231.13 |
| 7,129,858 B2 * | 10/2006 | Ferran et al. ......... | 341/11 |

* cited by examiner

*Primary Examiner*—Linh V. Nguyen
(74) *Attorney, Agent, or Firm*—Fay Sharpe LLP

(57) ABSTRACT

A novel encoder system adapted for use in print architecture at least includes: a codewheel coupled to a rotating print architecture element; a first encoder sensor mounted at a first position relative to the periphery of the codewheel, the first encoder adapted to output a first output signal; a second sensor mounted at a second position relative to the periphery of the codewheel, the second encoder adapted to output a second output signal, and the second sensor positioned substantially 180 degrees relative to the first encoder sensor; and a logic correction circuit adapted to receive the first and second output signals, and for outputting a correction signal with a period that is the average of the periods of the first and second output signals.

15 Claims, 3 Drawing Sheets

ENCODER RUNOUT ERROR CORRECTION CIRCUIT

FIELD OF THE INVENTION

The present invention generally relates to image reproduction devices or image forming apparatuses, such as high speed printers. More specifically, the present invention relates to improving the precision of aligning printing elements such as paper and rotating print drums in a system using low-cost encoder sensors.

BACKGROUND OF RELATED ART

U.S. Pat. No. 6,215,119 (hereafter "Markham patent") issued to Roger G. Markham, et al., and assigned to Xerox Corporation, the assignee of the present Patent Application, provides an extensive background of the environment in which the present invention operates. In the Markham patent, the problems associated with low-cost codewheel encoders, which have runout errors that have traditionally been thought to be too high for use with printing architecture utilizing codewheels, are addressed in a multiple printhead system. As was discussed in the Markham patent, hereby incorporated by reference, the firing of the printheads is precisely controlled. The errors in such printing systems can be caused by eccentricities in the construction of the rotating components (such as the imaging drum), or eccentricities in the mounting of the rotating element or the mounting of the codewheel.

The general solution and improvement proffered by the Markham patent is to use two low-cost encoders mounted 180 degrees apart to correct encoder runout error placing the rising edge of the corrected output halfway between the rising edges of the input signals. While this approach improves over single encoder approaches, some limitations still remain. The Markham patent approach suffers the possibility of glitches and discontinuities that occur in the correction signal when the rising edges of the output signals from both of the encoders cross each other. Such discontinuities are known to lead to defects in the print system images.

Averaging techniques to correct runout error may also be implemented using microcontrollers. The present invention presents an advantage over this approach because microcontrollers are often too slow for the amount and speed of processing required in high-speed printers. Many microcontrollers do not have sufficient timer resolution and are largely consumed performing this one task. Since most systems already contain an FPGA or ASIC, the present invention represents a significant cost savings, as it can be implemented in the FPGA or ASIC and will consume a very small amount of its resources.

Thus, there is a need to include low-cost encoders in high-speed printing architecture, correct for their higher runout errors, and do so in a manner that does not require a dedicated microprocessor, does not cause the processing delays or high bandwidth needs of microcontrollers in the associated environment, and eliminates possible glitches that occur when the rising edges of both encoders cross each other.

SUMMARY

In view of the above-identified problems and limitations of the prior art, the present invention provides an encoder system adapted for use in print architecture that at least includes: a codewheel coupled to a rotating print architecture element; a first encoder sensor mounted at a first position relative to the periphery of the codewheel, the first encoder adapted to output a first output signal; a second sensor mounted at a second position relative to the periphery of the codewheel, the second encoder adapted to output a second output signal, and the second sensor positioned substantially 180 degrees relative to the first encoder sensor; and a logic correction circuit adapted to receive the first and second output signals, and for outputting a correction signal with a period that is the average of the periods of the first and second output signals.

The present invention also provides an encoder signal processing method adapted for use in print architecture at least including: coupling a codewheel to a rotating print architecture element; mounting a first encoder sensor at a first position relative to the periphery of the codewheel; via the first encoder, outputting a first output signal; mounting a second sensor at a second position relative to the periphery of the codewheel, the second sensor positioned substantially 180 degrees relative to the first encoder sensor; via the second encoder, outputting a second output signal; and receiving the first and second output signals, and outputting a correction signal with a period that is the average of the periods of the first and second output signals.

BRIEF DESCRIPTION OF THE DRAWINGS

Features of the present invention will become apparent to those skilled in the art from the following description with reference to the drawings, in which.

DETAILED DESCRIPTION

The term "printer" refers, for example, to reproduction devices in general, such as printers, facsimile machines, and copiers.

Figure 1:
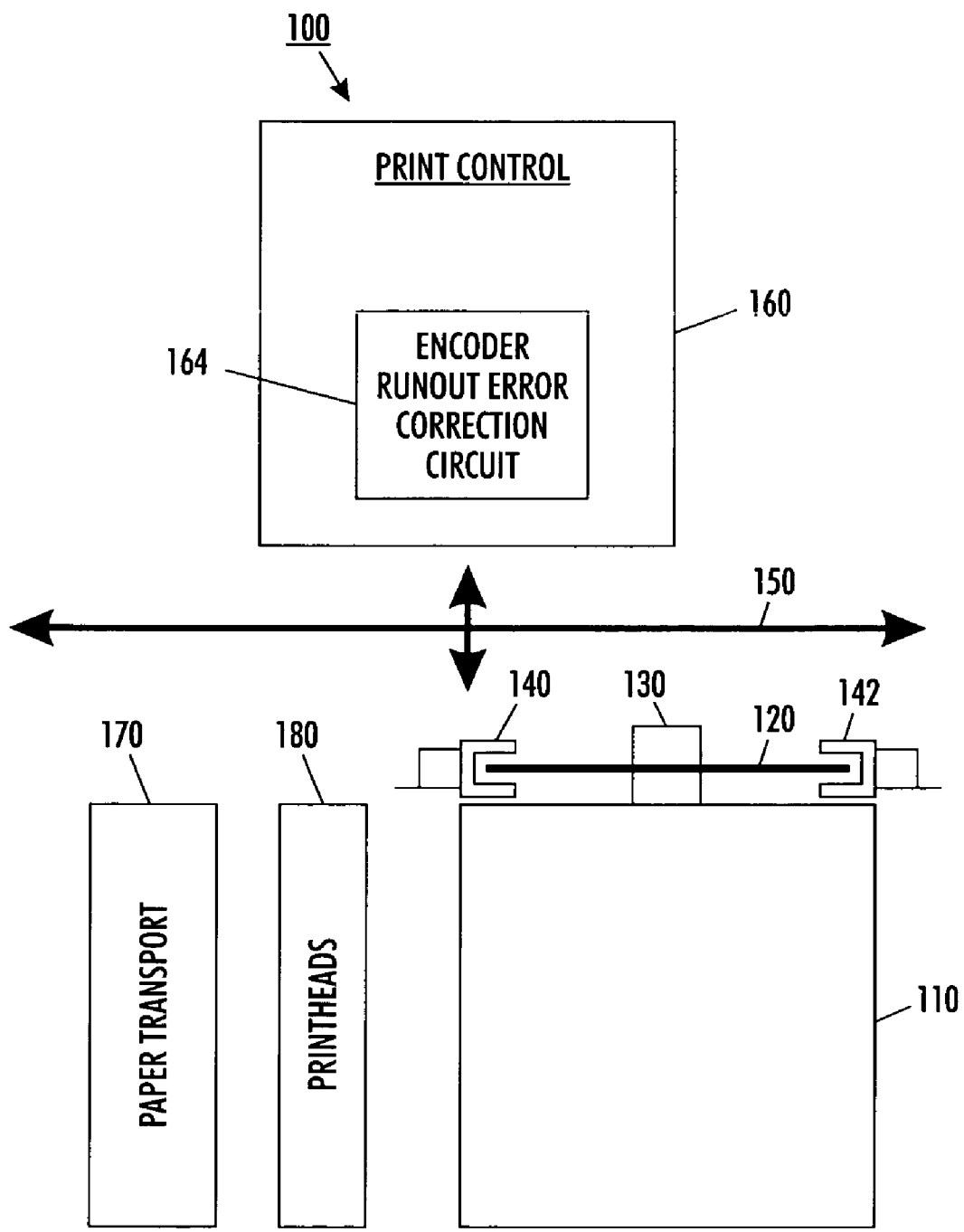
FIG. 1 is a schematic diagram of a portion of the printing architecture associated with the present-inventive encoder runout error correction scheme, including the imaging drum, the codewheel, encoders and the print control module.

The basic components of the printer architecture 100 needed to describe the present-inventive encoder runout error correction circuit are illustrated in FIG. 1. A rotating imaging drum 110 has a codewheel 120 mounted on its side via a mount 130. Two encoders 140 and 142 are mounted to the printing architecture 180 degrees apart in position to sense the position and movement of the codewheel.

The movement of the imaging drum is carefully synchronized with the operation of a paper transport mechanism 170 and a number of printheads 180, as will be appreciated by those skilled in the art to which the present invention pertains. The description heretofore is similar to the aforementioned (and incorporated by reference) Markham patent. The overall operation of the print system 100 is controlled by a print control module 160.

As was mentioned in the "Summary" section, supra, a logic circuit 164 implements the encoder runout error correction function to average the runout error of the two encoders 140 and 142. In the preferred embodiment the components of the printing system 100 communicate and receive control signals via a bus 150. However, those skilled in the art will appreciate that the components may be hard-wired without using a conventional bus. The encoder runout error correction circuit 164 is implemented via a field programmable gate array (FPGA) in the preferred embodiment. Other possible logic circuit implementations include, inter alia, an application specific integrated circuit (ASIC) or CPLD.

The encoder runout error correction circuit 164 may be thought of as a state machine for simplicity. The components of the circuit 164 are appropriately synchronized to clock pulses from a master clock (not shown).

Figure 2A:
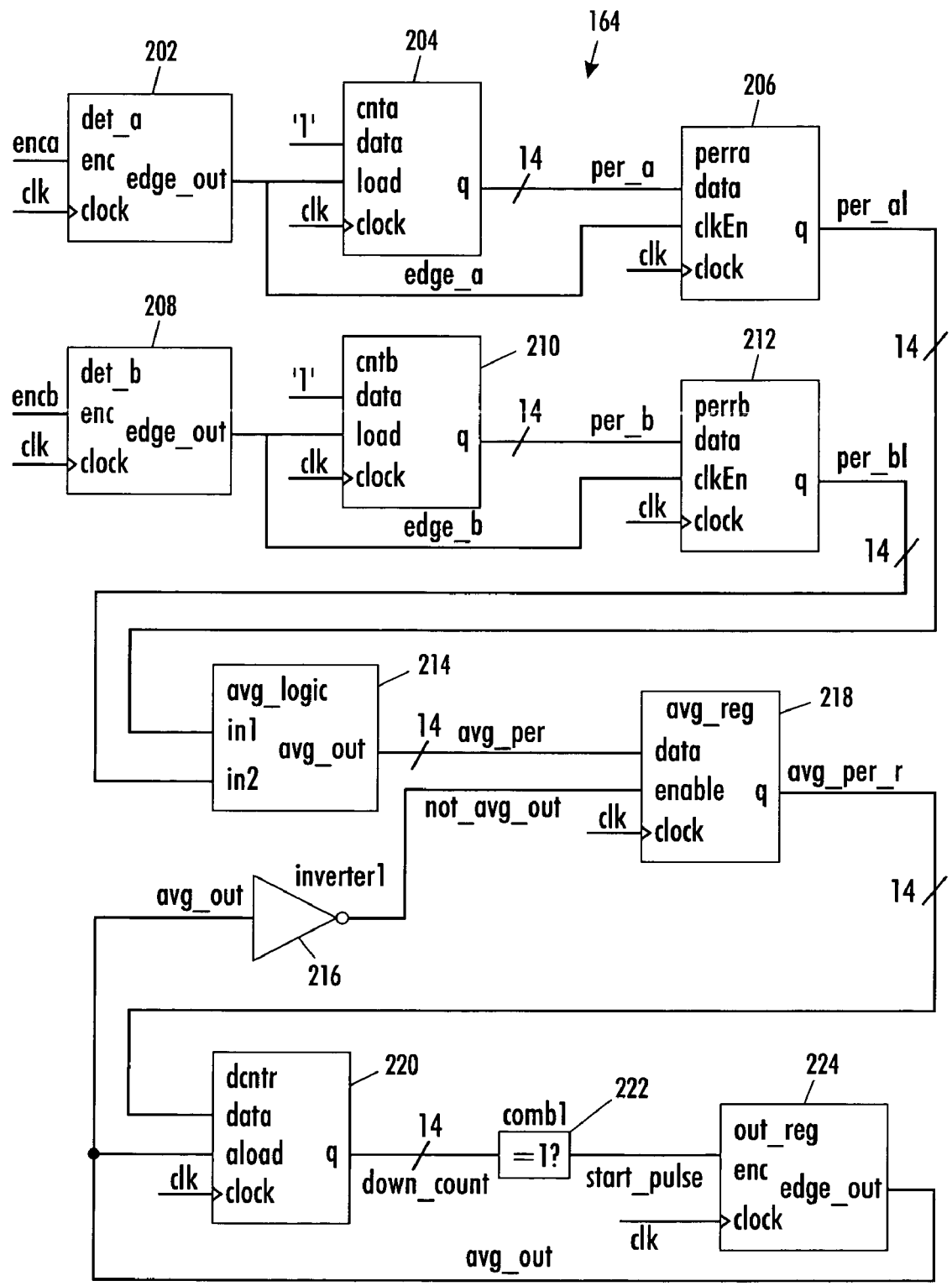
FIG. 2A is a schematic diagram of a first portion of the present-inventive encoder runout error correction circuit.
Figure 2B:
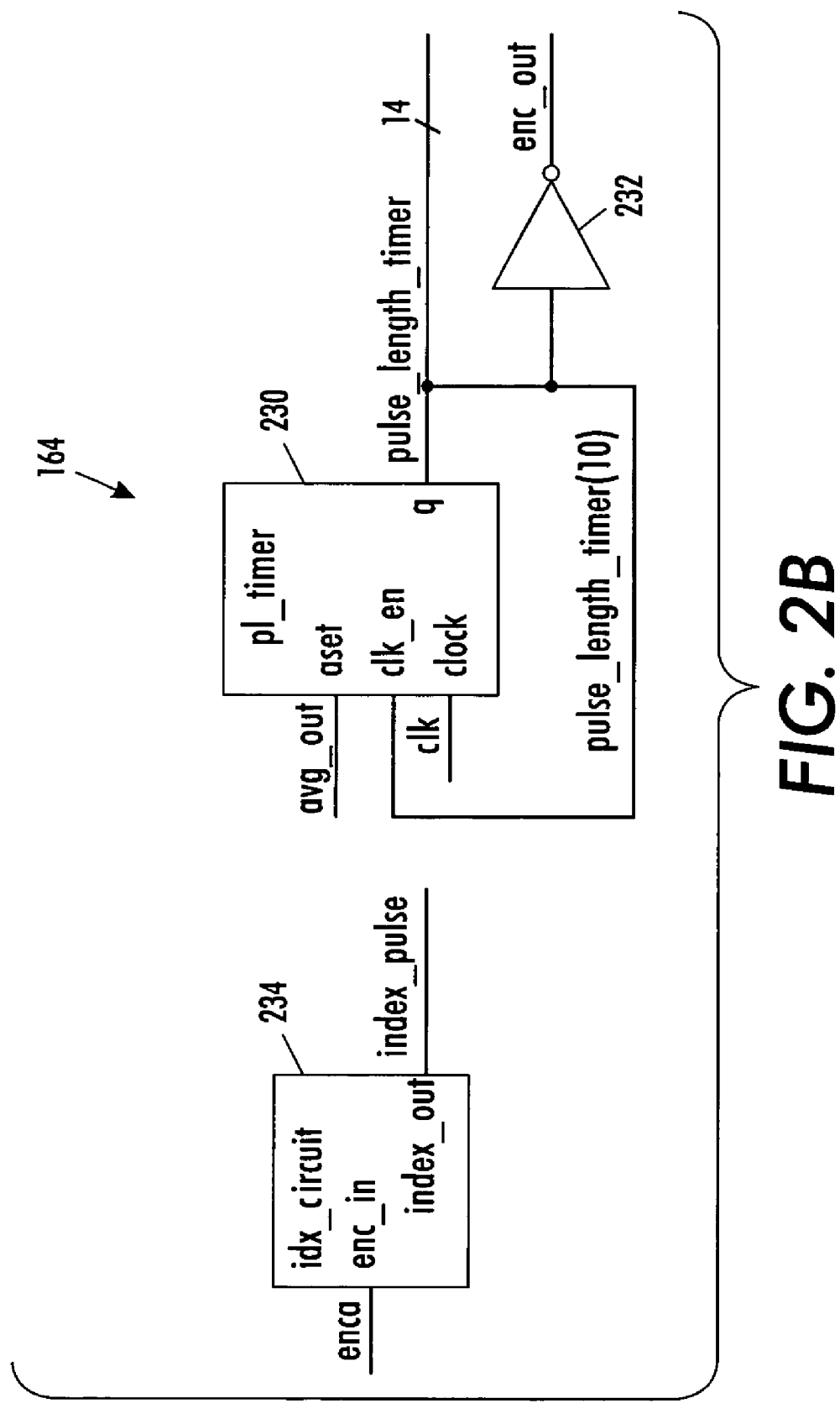
FIG. 2B is a schematic diagram of a second portion of the present-inventive encoder runout error correction circuit.

Turning to FIGS. 2A and 2B, two edge detectors 202 and 208 receive output signals (enca and encb) from the encoders 140 and 142, respectively. The edge detectors 202 and 208 detect the rising edges of the encoder output signals and output edge out signals one clock cycle long. The edge out signals are presented to two 14-bit up counters 204 and 210 to load the counters with the value "1." After the counters 204 and 210 are loaded, they begin counting up at the clock rate of 20 megahertz until they are once again cleared by the next rising edges of the encoder output signals. The number of clock cycles between rising edges represents the period of the encoder output signals.

The rising edge signals also activate period registers 206 and 212, which latch the period of the encoder output signals. The periods of the two encoder output signals are fed to a combinatorial logic element 214 that averages the two periods by adding the two periods, and then dividing the sum by two. The average period ("avg_per") output signal from the combinatorial logic element 214 is fed to an average period register 218, which is used to synchronize the average period signal to the clock signal. The synchronized average period signal ("avg_per_r") is introduced to a down counter 220, which times the period of the corrected signal ("enc_out").

When the down counter 220 reaches the count of "1," a combinatorial logic element 222 causes an "output register" 224 to output the average period signal. Element 224 is really an edge detector which outputs a one cycle pulse ("avg_out") having a period which is the average of the enca and encb signals. A feedback path supplies the avg_out signal to an input of the down counter, and to an inverter 216. The inverter and the resulting inverted avg_out signal ("not_avg_out") are used to avoid possible race states. Otherwise the value stored in the down counter 220 might be corrupted when the signal avg_per_r is change while the "aload" input is in transition to a logic low condition.

An index pulse generation circuit 234 generates an index pulse once per each revolution of the codewheel at the same position each time. Leading up to generating the index pulse, the circuit 234 counts each line of the encoder wheel until the predetermined total of lines on the codewheel is reached.

A down counter ("pl timer") 230 uses the avg_out signal from the register 224, which is fed to an input labeled "aset," and the clock pulse to generate a pulse length timer signal, the most significant bit of which is buffered by element 232 to form the corrected output signal ("enc_out"). The avg_out signal sets the "pl timer" 230 and raise 10 bits of the pulse_length_timer signal to change to a logic high condition. When the counter 230 counts down to zero, it is disabled and the corrected output signal enc_out is cleared until a new avg_out signal is received.

Variations and modifications of the present invention are possible, given the above description. However, all variations and modifications which are obvious to those skilled in the art to which the present invention pertains are considered to be within the scope of the protection granted by this Letters Patent.

What is claimed is:

1. An encoder system adapted for use in print architecture comprising:

a codewheel coupled to a rotating print architecture element;

a first encoder sensor mounted at a first position relative to the periphery of said codewheel, said first encoder adapted to output a first output signal;

a second sensor mounted at a second position relative to the periphery of said codewheel, said second encoder adapted to output a second output signal, and said second sensor positioned substantially 180 degrees relative to said first encoder sensor; and a logic correction circuit adapted to receive said first and second output signals, and generate a first and second digital count signal the count of which is indicative respectively of the period of the first and second output signal and for outputting a correction signal with a period that is the average of said first and second digital count signals.

2. An encoder signal processing method adapted for use in print architecture comprising:

a) coupling a codewheel to a rotating print architecture element;

b) mounting a first encoder sensor at a first position relative to the periphery of said codewheel;

c) via said first encoder, outputting a first output signal;

d) mounting a second sensor at a second position relative to the periphery of said codewheel, said second sensor positioned substantially 180 degrees relative to said first encoder sensor;

e) via said second encoder, outputting a second output signal; and f) receiving said first and second output signals and generating a first and second digital signal the count of which is indicative respectively of the period of said first and second output signals, and outputting a correction signal with a period that is the average of said first and second digital signals.

3. The encoder system of claim 1, wherein said rotating print architecture element comprises an imaging drum.

4. The encoder system of claim 1, wherein said rotating print architecture element comprises an imaging drum, and said codewheel is coupled to an end of said imaging drum.

5. The encoder system of claim 1, wherein said logic correction circuit comprises an FPGA.

6. The encoder system of claim 1, wherein said logic correction circuit comprises an ASIC.

7. The encoder system of claim 1, wherein said logic correction circuit comprises a CPLD.

8. The encoder system of claim 1, wherein said logic correction circuit comprises a state machine.

9. The encoder signal processing method of claim 2, wherein element f) is carried out via a logic correction circuit.

10. The encoder signal processing method of claim 2, wherein said rotating print architecture element comprises an imaging drum.

11. The encoder signal processing method of claim 2, wherein said rotating print architecture element comprises an imaging drum, further comprising: coupling said codewheel to an end of said imaging drum.

12. The encoder signal processing method of claim 2, wherein said logic correction circuit comprises an FPGA.

13. The encoder signal processing method of claim 2, wherein said logic correction circuit comprises an ASIC.

14. The encoder signal processing method of claim 2, wherein said logic correction circuit comprises a CPLD.

15. The encoder signal processing method of claim 2, wherein said logic correction circuit comprises a state machine.

* * * * *